United States Patent [19]
Sugimoto

[11] Patent Number: 5,989,420
[45] Date of Patent: Nov. 23, 1999

[54] POROUS CERAMIC FILTER, METHOD OF MANUFACTURING THE SAME, CERAMIC FILTER MANUFACTURING EXTRUSION MOLDING DIE AND EXTRUSION MOLDING APPARATUS USING THE DIE

[75] Inventor: Akitoshi Sugimoto, Kouchi, Japan

[73] Assignees: Yuugengaisya Mikazuki Bunkakaikan; Yuugengaisya Mama Green Golf, both of Kouchi-ken, Japan

[21] Appl. No.: 08/700,523

[22] PCT Filed: Dec. 27, 1995

[86] PCT No.: PCT/JP95/02712

§ 371 Date: Aug. 27, 1996

§ 102(e) Date: Aug. 27, 1996

[87] PCT Pub. No.: WO96/20037

PCT Pub. Date: Jul. 4, 1996

[30] Foreign Application Priority Data

Dec. 27, 1994 [JP] Japan .................................. 6-325525

[51] Int. Cl.$^6$ ........................... B01D 35/06; B01D 39/00; B06B 3/00; C04B 35/622

[52] U.S. Cl. ............... 210/222; 210/500.23; 210/500.25; 210/504; 210/506; 55/523; 55/524; 96/1; 264/451; 264/70; 264/125; 264/402; 264/407; 264/413; 264/628; 264/629; 264/632; 264/DIG. 48; 427/127; 427/128; 427/244; 427/245

[58] Field of Search ..................... 264/109, 123, 264/125, 402, 405, 407, 413, DIG. 48; 427/244, 245, 127, 128; 210/510.1, 222, 500.23, 500.25, 504, 506; 55/523, 524; 96/1

[56] References Cited

U.S. PATENT DOCUMENTS

| | | | |
|---|---|---|---|
| 4,279,748 | 7/1981 | Inoue | 210/510.1 |
| 4,728,503 | 3/1988 | Iida et al. | 55/380 |
| 5,068,068 | 11/1991 | Furusawa et al. | 264/407 |
| 5,098,571 | 3/1992 | Maebashi | 210/510.1 |
| 5,558,760 | 9/1996 | Sekhar | 210/510.1 |

FOREIGN PATENT DOCUMENTS

| | | |
|---|---|---|
| 62-297110 | 12/1987 | Japan . |
| 63-44917 | 2/1988 | Japan . |
| 1-27853 | 8/1989 | Japan . |
| 1-317593 | 12/1989 | Japan . |
| 2-139014 | 5/1990 | Japan . |
| 3-78130 | 12/1991 | Japan . |
| 4-357003 | 12/1992 | Japan . |

*Primary Examiner*—David A. Reifsnyder
*Attorney, Agent, or Firm*—Young & Thompson

[57] ABSTRACT

A ceramic filter containing at least one functional material and method of manufacturing, a ceramic filter whose surface through which a liquid to be purified flows into is densest and the average particle size of the filter continuously increases toward the interior thereof, a method of manufacturing the ceramic filter including ultrasonic vibration, an extrusion molding die used to manufacture the ceramic filter and an extrusion molding apparatus using the die.

36 Claims, 7 Drawing Sheets

POROUS CERAMIC FILTER, METHOD OF MANUFACTURING THE SAME, CERAMIC FILTER MANUFACTURING EXTRUSION MOLDING DIE AND EXTRUSION MOLDING APPARATUS USING THE DIE

TECHNICAL FIELD

The present invention relates to a porous ceramic filter of high performance and high capability for removing organic and inorganic impure substances, polluted (harmful) substances, nastily-smelled substances and the like from a liquid containing these substances, and more specifically, for obtaining clean drinking water and clean water by filtrating organic substances and inorganic substances from water polluted by them such as tap water, river water, seawater, swimming pool water, water drained from factories and houses, and the like or obtaining beer, wine, Japanese sake, soy sauce, sauce, juice, fruit juice, cooking oil and the like by filtrating various solid substances and impurities therefrom, a method of manufacturing the porous ceramic filter, an extrusion molding die used to manufacture the porous ceramic filter and an extrusion molding apparatus provided with the die.

Further, the present invention relates to a porous ceramic filter provided with a functional property and a method of manufacturing it.

BACKGROUND ART

Conventionally, there have been proposed and used many types of filtrating apparatuses for filtrating various polluted substances, smelled (nasty) substances and impurities which are unsuitable for drinking to obtain drinking water from river water, seawater and drained water. Further, there are commercially available water purifying devices and the like for removing a nasty smell (foul smell) and a bad taste caused by organic substances, inorganic substances and the like contained in well water and tap water in a slight amount. Many of the water purifying devices use a filter unit.

Additionally, a filtrating process is indispensable to food industries to remove solid substances and impurities from fermented products for making beer, wine, Japanese sake, soy sauce etc. and to remove solid substances and impurities to obtain sauce, juice, fruit juice, cooking oil etc. from a food material.

In particular, since drinking water, liquors, fruit juice, juice, sauce, cooking oil etc. are used for drinking or eating, a very high performance is required of a purifying apparatus, thus a high performance is also required of a filtrating device.

Further, with the recent fitness boom, many persons enjoy swimming as an exercise of every part of the body regardless of age and sex and the number of persons visiting swimming pools is increasing.

With this trend, there is an increasing interest in the sanitary state of the swimming pool and in particular in the quality of water to enjoy swimming more safely and sanitarily. Thus the requirements for a purifying apparatus by which the quality of water in the swimming pool is established is made more and more strict and thus the performance of a filtrating device used meet this requirement must be of the highest level.

Further, filtrating devices are now being widely used in processing water from a low purity level to a high purity level in such fields as the water purification in zoos, aquariums and the like, the pre-processing in the manufacture of pure water used for the production of semiconductors and the desalination of seawater, the quahouse and 24-hour open bath, water processing for an intermediate water supply, decolorization processing required by the environmental standards and the like.

Many porous ceramic filters are used as the filter element of the filtrating apparatus. The porous ceramic filter (hereinafter, referred to as a ceramic filter) has very fine three-dimensional filtrating spaces (holes) which are very preferable to the filtration of water in the swimming pool and in particular in the warm water swimming pool and can preferably filtrate organic substances such as oil and the like, structures, protein, bacteria, viruses and the like discharged from human bodies.

The purifying capability of a ceramic filter is determined by the size of micropores used in filtration, wherein the smaller the micropore size, the more excellent the purifying capability of the filter. Further, when the ease of cleaning the filter by reverse washing and the like is taken into consideration it is preferable that impurities and the like in a liquid to be purified are captured on the surface of the ceramic filter.

Therefore, it is preferable that a ceramic filter is particularly close on the surface thereof through which a liquid to be purified flows in. However, since the ceramic filter is usually manufactured by preparing a compound made by mixing and kneading fine particles with a binder, forming the compound to a molded product having a predetermined shape by compacting and molding it and sintering the molded product, manufacturing a ceramic filter having the above structure is not feasible.

To manufacture a ceramic filter having the above structure (having an average particle size which is made smaller toward the surface thereof), it is contemplated to manufacture a ceramic filter having a preferable particle distribution in which the filter surface through which a liquid to be purified flows into is particularly close, in such a manner that a compound (slurry) composed of still more ultrafine particles is coated on the surface of a molded product, dried and then sintered to thereby form a layer composed of the ultrafine particles on the surface of the filter.

However, this manufacturing method is troublesome and time consuming. Additionally, the manufacturing cost of the ceramic filter is high. Moreover, the slurry must be repeatedly coated and dried many times to sufficiently form the layer composed of the ultrafine particles on the surface. Further, the thus made ceramic filter has a two-layered surface structure or a multi-layered structure as FIG. 9 schematically shows. Thus, the coated layer located on a base member is not perfectly arranged as an integral part thereof. Therefore, the coated thin layer is easily exfoliated while the filter is subjected to reverse washing or executes filtration and the exfoliation expands. As result, the purifying capability of the exfoliated portion is lowered and the portion cannot exhibit a desired purifying capability, by which serious problems such as short life of the ceramic filter and the like are caused in practical use.

On the other hand, since the conventional ceramic filter is made more coarse toward the surface thereof, when it is used for filtration without using a filtration assistant, impurities enter from a surface to the filter deep interior and cause clogging. Thus, it is very difficult to clean (reversely wash) the filter.

To cope with this problem, a filtration apparatus using the ceramic filter forms the layer of a fibrous filtration assistant such as pulp fibers, asbestos or the like or the layer of fine particle filtration assistant such as diatom earth, lime or the like, that is, a so-called filtration assistant layer on the surface of the filter through which water to be filtrated flows in to thereby make the surface of the ceramic filter to a close state for the prevention of clogging of the ceramic filter and cleaning effected by reverse washing easy. In this instance, a problem arises in that the filter cleaning becomes a time-consuming job.

Further, it is desired that a filter fulfills other functions such as, for example, heating, sterilization, control of a specific component, pre-processing for a special process used to the manufacture of pure water, the desalination of seawater, and the like.

DISCLOSURE OF THE INVENTION

An object of the present invention for solving the above problems of prior art is to provide a ceramic filter arranged such that at least one surface thereof, preferably the surface thereof through which a liquid to be purified flows into is composed of the closest surface portion, the (average) size of the fine particles constituting the ceramic filter continuously increases from the surface toward the interior of the wall thick portion thereof to thereby form the ideal distribution of a particle size and ensure that the costs of materials and the like are low; a method of easily manufacturing such a filter; a porous ceramic filter manufacturing extrusion molding die used for the manufacture of such a filter; and an extrusion molding apparatus using such a die.

Another object of the present invention is to provide a ceramic filter to which applied is a function in accordance with a functional material intentionally added thereto; a method of manufacturing the ceramic filter; an extrusion molding die for manufacturing the filter; and an extrusion molding apparatus using the die.

The present invention provides a porous ceramic filter composed of sintered fine particles and having a feature that the filter contains at least one functional material. It is preferable that the ceramic filter is composed of a hollow cylindrical body or a cylindrical body having a center through hole and a plurality of through holes formed between the center through hole and the outer filter peripheral surface and extending in the same direction as the center through hole.

The present invention provides a porous ceramic filter composed of sintered fine particles and having a feature that the average particle size of the fine particles forming the porous ceramic filter continuously increases from at least one surface toward the interior of a wall thick portion.

The present invention provides a porous ceramic filter composed of a hollow cylindrical body in which the average particle size of fine particles continuously increases from the outer peripheral surface and/or the inner peripheral surface of the cylindrical body toward the interior of the wall thick portion.

The present invention provides a porous ceramic filter composed of a cylindrical body having a center through hole and a plurality of through holes formed between the center through hole and the outer filter peripheral surface and extending in the same direction as the center through hole in which the average particle size of the fine particles forming the porous ceramic filter continuously increases from any one, any two or all the surfaces of the outer peripheral surface selected from the cylindrical body, the peripheral surface of the center through hole and at least one peripheral surface of a plurality of the through holes toward the interior of the wall thick portion.

It is preferable that these ceramic filters contain at least one functional material. The functional material may be any material and any type such as a magnetic material, a catalyst, an ion supplying or capturing material, a dielectric substance, a conductor, a semiconductor and the like so long as they can apply a predetermined function and it is preferable that to provide an electrode with the ceramic filter and impose electric power thereon.

The present invention provides a method of manufacturing a porous ceramic filter by preparing a material compound containing material fine particles and a binder, molding the material compound to a predetermined shape and sintering the molded product in which the molding is executed while applying ultrasonic waves to at least one surface of the molded product.

The present invention provides a method of manufacturing a porous ceramic filter in which the molded product is composed of a cylindrical body having at least one through hole and the molding is executed while applying ultrasonic waves to the outer peripheral surface and/or the peripheral surface of the at least one through hole of the molded product.

The present invention provides a method of manufacturing a porous ceramic filter in which the molded product is composed of a cylindrical body having a center through hole and a plurality of through holes formed between the center through hole and the outer filter peripheral surface and extending in the same direction as the center through hole and the molding is executed while applying ultrasonic waves to any one surface, any two surfaces or all the surfaces selected from the outer peripheral surface of the molded product, the peripheral surface of the center through hole and the peripheral surface of at least one of the through holes formed to the wall thick portion.

A compound may contain the functional materials. Any number of the types of the functional materials may be selected and added in accordance with functions to be applied.

In the above ceramic filter manufacturing methods, it is preferable that the molded product of the ceramic filter extruded by an extrusion device is closely pressed while being applied with ultrasonic vibrations. The close pressing of the molded product provides the entire molded product with a close structural body as well as improves the transmission of the ultrasonic vibration because the vibration is applied to the surface of the close structure to thereby decrease the average particle size of the surface portion of the molded product, so that there can be obtained an ideal ceramic filter having the average particle size which continuously increases from the surface thereof to the deep interior thereof.

The present invention provides a porous ceramic filter manufacturing extrusion molding die used by being coupled with an extrusion device in the manufacture of a porous ceramic filter in which an ultrasonic vibrator is disposed to at least one location in the wall of the die for forming the molded product of the ceramic filter extruded by the extrusion device.

The present invention provides a porous ceramic filter manufacturing extrusion molding die used by being coupled with an extrusion device in the manufacture of a porous ceramic filter composed of a cylindrical body having at least one through hole, the extrusion molding die comprising a mold having a cavity for forming the exterior of the molded product of a ceramic filter extruded by an extrusion device and at least one core disposed in the cavity of said mold by extending in an extruding direction and detachably mounted in said mold for forming the through hole of said ceramic filter, wherein ultrasonic vibrators are disposed in said mold and/or said at least one core.

Further, the present invention provides a porous ceramic filter manufacturing extrusion molding die used by being coupled with an extrusion device in the manufacture of a porous ceramic filter having a center through hole and a plurality of through holes formed between the center through hole and the outer filter peripheral surface and extending in the same direction as the center through hole. The extrusion molding die comprising a mold having a space for forming the exterior of the molded product of a ceramic filter extruded by the extrusion device and a first core disposed in the space of the mold by extending in an extruding direction for forming the center through hole and a plurality of second cores disposed between the inner wall surface of the mold and the first core for forming a plurality of the through holes, in which at least one ultrasonic vibrator is disposed to at least one element selected from the mold, the first core and at least one of the second cores.

It is very preferable that the above ceramic manufacturing extrusion molding die is provided with a means for gradually reducing the space through which the molded product of the ceramic filter extruded by the extrusion device passes from the base end of the die to the distal end thereof so as to closely press the molded product by the means. The close press means can be arranged by a space reducing structure for gradually reducing the size of the cavity composed of the mold and the core through which the molded product passes. As a specific example of the press means, it is preferable to gradually reduce the diameter of the mold portion and gradually increase the diameter of the core. However, any other structure may be used so long as it is arranged as the space reducing structure.

Further, the present invention provides an extrusion molding apparatus including the aforesaid die coupled with an extrusion device.

BEST MODE OF CARRYING OUT THE INVENTION

A porous ceramic filter, a method of manufacturing the porous filter, an extrusion molding die for manufacturing the filter and an extrusion molding apparatus provided with the die of the present invention will be described below in detail.

The following inventions are provided by the present invention.
(1) ceramic filter:
  (1-a) filter containing at least one functional material;
  (1-b) filer having a close surface;
  (1-c) filer having a close surface and containing at least one functional material;
(2) method of manufacturing a ceramic filter:
  methods of manufacturing the filters of the above items (1-a), (1-b) and (1-c);
(3) die for manufacturing the ceramic filter; and
(4) ceramic filter continuously manufacturing apparatus provided with the above die.

The porous ceramic filter of the present invention (hereinafter, referred to as a ceramic filter) is a filter made by sintering fine particles and having very fine holes formed three-dimensionally so that it can filtrate not only oil and tissues discharged from human bodies but also impurities such as microbes including viruses, bacteria and the like. This filter is applicable to various fields of industries as described in the beginning of this specification.

Figure 1A:
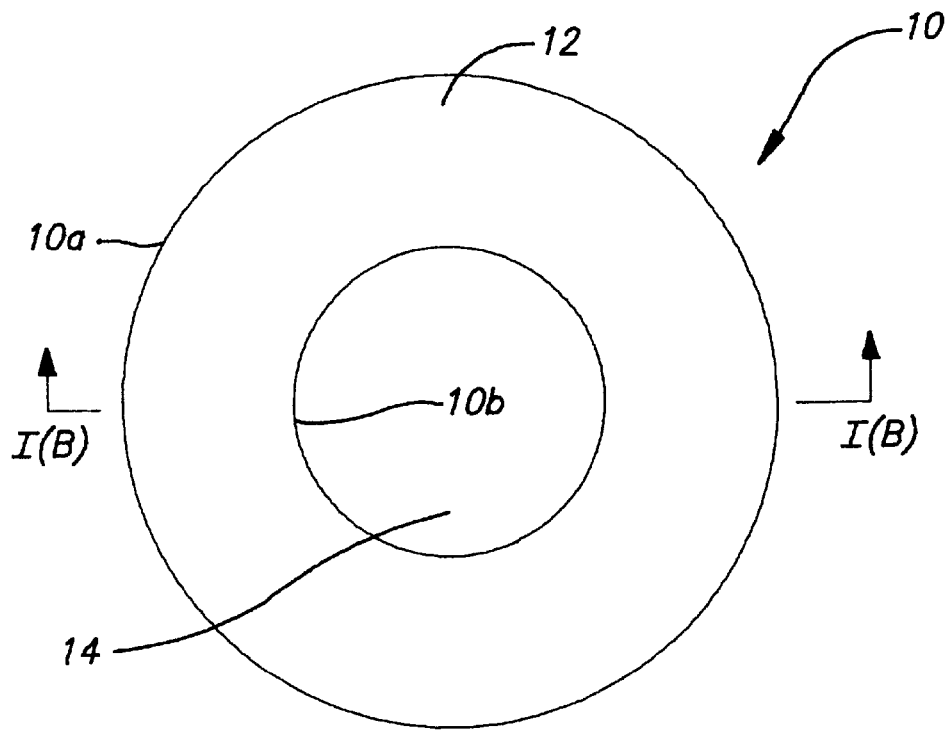
FIG. 1 is a conceptual view showing an example of a ceramic filter of the present invention, wherein FIG. 1(*a*) is a plan view and FIG. 1(*b*) is a cross sectional view taken along the line I(*b*) of FIG. 1(*a*)
Figure 1B:
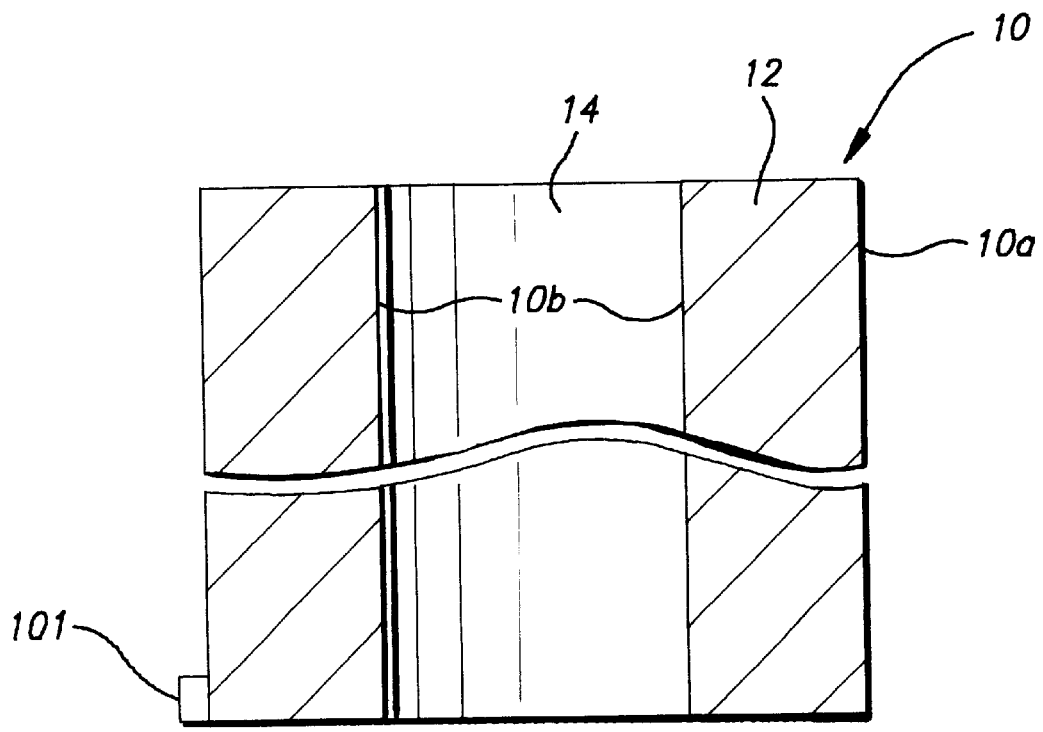

FIG. 1 is a schematic view showing an embodiment of the ceramic filter, wherein FIG. 1(*a*) is a plan view and FIG. 1(*b*) is a cross sectional view taken along the line I(b) of FIG. 1(*a*), respectively.

A ceramic filter 10 illustrated as an example is composed of a hollow cylindrical body made by sintering fine particles. In a purifying apparatus using the ceramic filter 10 illustrated in FIG. 1, a liquid such as water in the swimming pool and the like to be purified (liquid to be purified, hereinafter referred to as unpurified water for the purpose of convenience) is supplied to the outer peripheral surface of the ceramic filter 10, flows therein through the outer peripheral surface 10*a* of the cylindrical body through a wall thick portion 12 and then exits the filter through the inner peripheral surface 10*b* and the filter center and is collected. Otherwise, on the contrary, the unpurified water is supplied to the filter center through hole 14 of the ceramic filter 10, flows into the ceramic filter 10 from the inner peripheral surface 10*b* through the wall thick portion 12 and then flows to the outside through the outer peripheral surface 10*a* and collected. In this manner, removed impurities such as bacteria, oil and the like arecaptured by the ceramic filter 10 and removed from the unpurified water and finally the unpurified water is purified.

The ceramic filter of the present invention has such an integrated arrangement (not a layered structure) that the average particle size of the fine particles constituting the filter continuously increases from at least one surface of the filter, preferably from the surface of the filter through which the unpurified water flows in toward the interior of the wall thick portion of the filter. The exemplified ceramic filter 10 is an example in which the average particle size of the fine particles continuously increases from the outer peripheral surface 10*a* toward the interior of the wall thick portion 12. That is, the structure of the ceramic filter is made gradually closer toward the outer periphery thereof.

Figure 2:
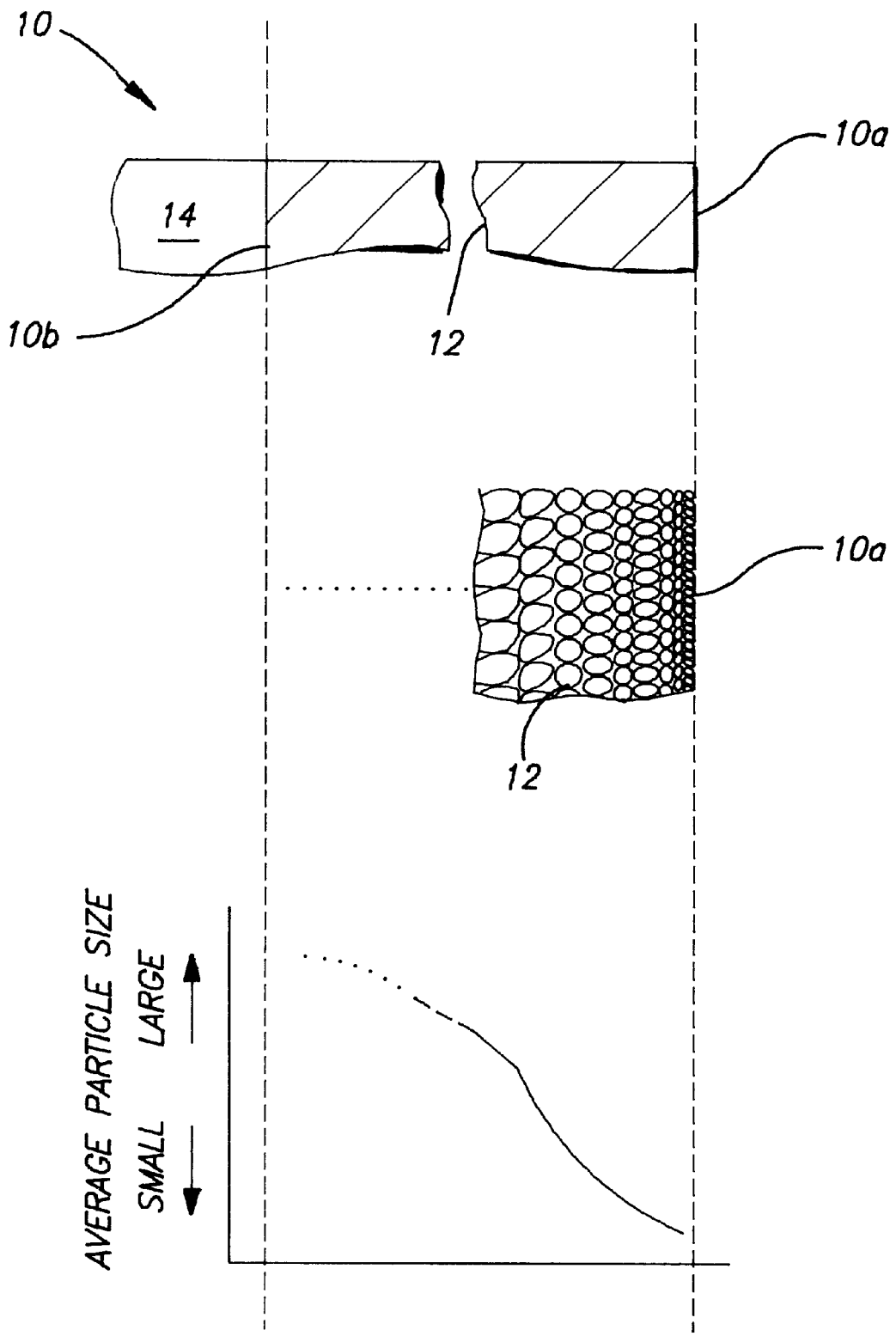
FIG. 2(*a*) is a partially enlarged view of the ceramic filter shown in FIG. 1, FIG. 2(*b*) is a view conceptually showing the variation of the average particle size of fine particles in the vicinity of the outer periphery of the ceramic filter and FIG. 2(*c*) is a view showing the variation of the average particle size of the ceramic filter by a graph.

FIG. 2 schematically shows the variation of the average particle size.

FIG. 2(*a*) is a view partially enlarging the upper right portion of the ceramic filter 10. The average particle size of the fine particles constituting the ceramic filter 10 continuously increases from the outer peripheral surface 10a toward the interior thereof as schematically shown in FIG. 2(b). Although the curve shown in FIG. 2(c) has a gradient different depending upon various factors such as the arrangement of the particle size in a compound, the frequency of an ultrasonic wave imposed to the ceramic filter in the manufacturing process thereof, time and the like, the average particle size increases from the outer peripheral surface 10a toward the interior in any case.

That is, this embodiment has such an integrated arrangement that the filtering space of the ceramic filter 10 is closest on the outer peripheral surface 10a and the average particle size continuously increases from the outer peripheral surface 10a toward the interior thereof and is preferably applicable to a purifying apparatus for supplying unpurified water from the outer peripheral surface 10a of the ceramic filter 10.

Since the ceramic filter 10 of the present invention arranged as described above is very close on the surface thereof through which unpurified water flows in, that is, on the outer peripheral surface 10a in the illustrated example and the filtrating space gradually increases toward the direction in which water flows, impurities are intensively captured in the vicinity of the outer peripheral surface 10a. Thus, the ceramic filter 10 can exhibit a very high purifying capability. Further, since almost all the impurities are captured on the surface through which the unpurified water flows in, the impurities therein captured can be easily and well removed from the ceramic filter by reverse washing and the like. Therefore, there can be realized a ceramic filter which need not be replaced due to clogging for a long time and has a long life. Further, since the ceramic filter achieves a good cleaning efficiency, it can be operated at a high efficiency due to the good cleaning efficiency.

Moreover, a filtration assistant needed by a conventional ceramic filter is made unnecessary by making the surface of the fine particles through which unpurified water flows in sufficiently close, whereby the operating efficiency of the purification apparatus can be improved.

Figure 9:
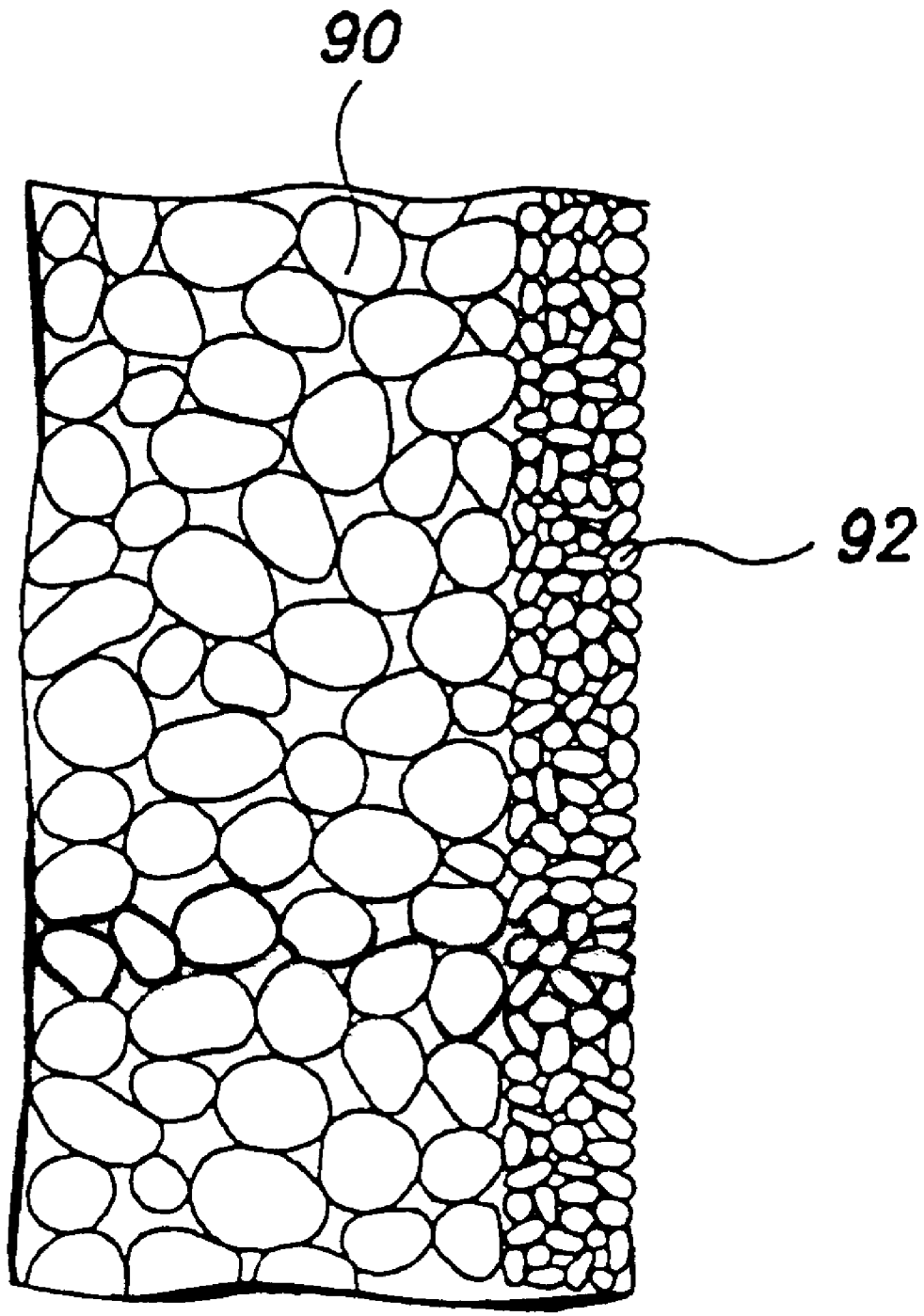
FIG. 9 is a view conceptually showing the vicinity of the surface of a conventional ceramic filter.

Further, as shown in FIG. 9, a ceramic filter, to which the process for coating slurry containing still more ultrafine particles to the surface of the molded product and sintering it as described above is applied, is formed to a multi-layered structure composed of an inner molded product layer 90 and the layer thereon formed by coating the slurry and these layers are not sufficiently integrated with each other with an upper layer 92 formed thinner and a particle size distributed not continuously but stepwise. Therefore, the fine particle layer 92 on the surface of the filter is liable to be exfoliated from the lower layer 90 thereunder by an impact generated when a filtration assistant layer is formed or the filter is reversely washed and the exfoliation is liable to spread, by which a problem is arisen in practical use as described above. However, since the particle sizes of the ceramic filter 10 of the present invention are not distributed so as to vary in the respective layers of the filter but the average particle size thereof is distributed so as to continuously vary as shown in FIG. 2 as well as the ceramic filter is integrally arranged, no layer exfoliation is caused to the ceramic filter and the ceramic filter can exhibit a predetermined capability for a long time. In this point of view, there can be also realized a long life ceramic filter.

The ceramic filter of the present invention is basically arranged such that the average particle size of the fine particles constituting the filter continuously increases from the surface thereof through which unpurified water flows in toward the interior thereof, thus in a hollow cylindrical ceramic filter such as the ceramic filter 10 exemplified in the drawing, the average particle size of the fine particles constituting the filter continuously increases from the outer peripheral surface 10a and/or the inner peripheral surface 10b toward the interior thereof.

In another embodiment, the average particle size of the fine particles constituting the ceramic filter 10 continuously increases from the inner peripheral surface 10b toward the interior of the wall thick portion 12. That is, the filtrating space of the ceramic filter of this embodiment is closest on the inner peripheral surface 10b and the average particle size continuously increases from the inner peripheral surface 10b toward surface 10a, thus the filter is preferably used to a purifying apparatus for supplying unpurified water from a center through hole 14a.

Further, in still another embodiment, the average particle size of the fine particles constituting the ceramic filter 10 continuously increases from both the inner peripheral surface 10b and the outer peripheral surface 10a toward the interior of the wall thick portion 12. That is, in this embodiment, the filtrating space of the ceramic filter is closest on the inner peripheral surface 10b and the outer peripheral surface 10a and the average particle size continuously increases from both the surfaces toward the interior, thus this filter is preferably used when unpurified water is selectively supplied from either of the outer peripheral surface 10a of the ceramic filter 10 and the center through hole 14a thereof.

Figure 3A:
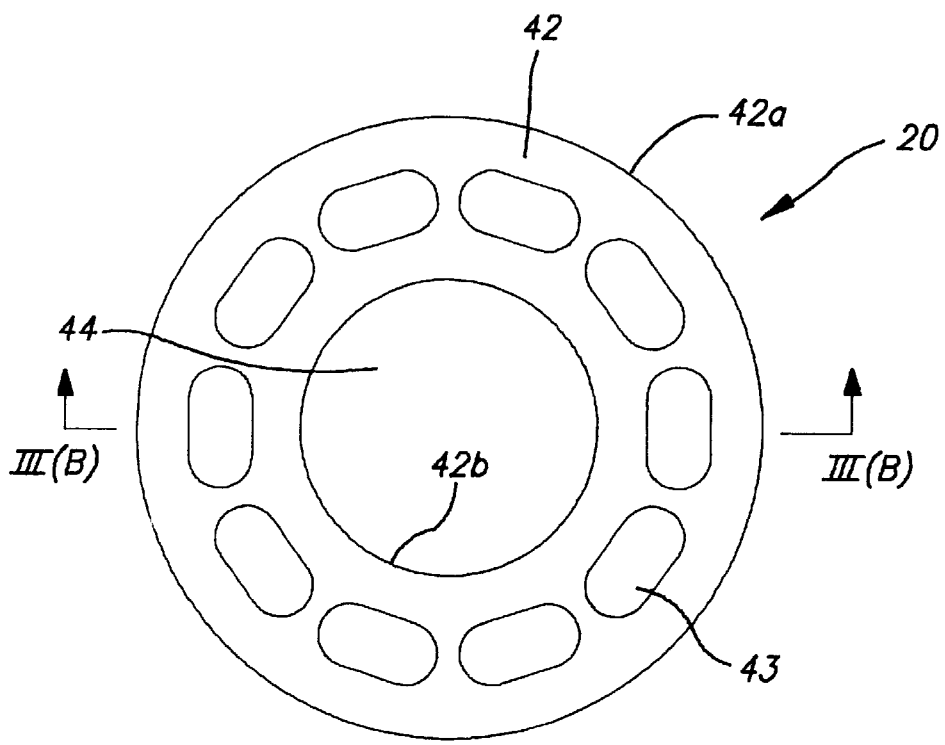
FIG. 3 is a conceptual view showing another example of the ceramic filter of the present invention, wherein FIG. 3(*a*) is a plan view and FIG. 3(*b*) is a cross sectional view taken along the line III(b) of FIG. 3(*a*)
Figure 3B:
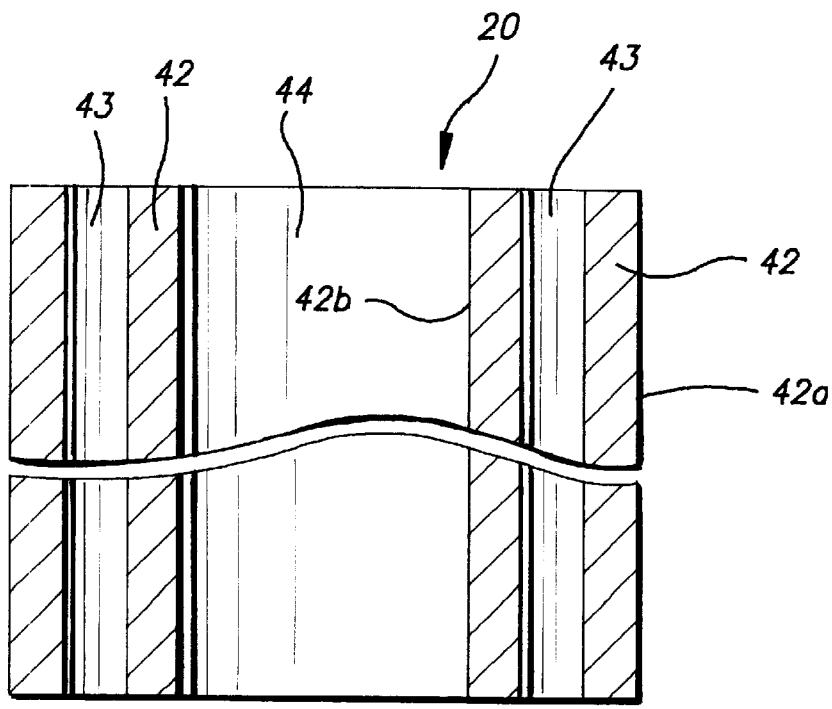

FIG. 3 is schematic views showing a further embodiment of the ceramic filter of the present invention, wherein FIG. 3(a) is a plan view and FIG. 3(b) is a cross sectional view taken along the line III(b) of FIG. 3(a), respectively.

Although the ceramic filter 10 shown in FIG. 1 is composed of the hollow cylindrical body having the center through hole 14, the ceramic filter 20 shown in FIG. 3 has a plurality of through holes 43 to the wall thick portion 42 of the cylindrical body defined by an outer peripheral surface 42a and an inner peripheral surface 42b in addition to a center through hole 44 as shown in FIG. 3(a) and FIG. 3(b).

Note, although ten pieces of the through holes 43 each having an oval shape are formed within the wall thick portion 42 in the illustrated example, the number and shape thereof are not particularly limited.

The ceramic filter 20 has a plurality of the through holes 43 formed to the wall thick portion 42 in addition to the center through hole 44. Therefore, the ceramic filter 20 of the illustrated example can filtrate unpurified water by two methods as mentioned below.

(1) The same type or a different type of unpurified water is admitted not only through the outer peripheral surface of the ceramic filter 20 but also through the center through hole 44 so that the same type or the different type of the unpurified water flows in from both the outer peripheral surface 42a and the inner peripheral surface 42b and purified water is collected from the through holes 43. Otherwise, unpurified water is supplied from the through holes 43 and flown in from the wall surfaces of the through holes 43 and purified water is flown out from both the outer peripheral surface 42a and the inner peripheral surface 42b, whereby the processing capability of the ceramic filter 20 can be greatly improved and further the purified water can be supplied to different locations.

(2) The ceramic filter 20 can purify water in two steps in such a manner that unpurified water is flown in from the outer peripheral surface 42a of the wall thick portion 42 and primarily purified water is collected to the through holes 43 and further the primarily purified water is passed through the ceramic filter and flown out from the outer peripheral surface 42a and collected from the center through hole 44 or, on the contrary, unpurified water is supplied to the center through hole 44 and passed from the inner peripheral surface 42b to the outer peripheral surface 42a through the through holes 43, so that the degree of purification of water such as swimming pool water and the like can be greatly improved.

Likewise, the aforesaid ceramic filter 10, the ceramic filter 20 of the present invention is composed of fine sintered particles and the average particle size of the fine particles constituting the filter continuously varies toward the interior thereof with the surface thereof through which unpurified water flows in arranged closely.

For example, in an embodiment of the ceramic filter 20 according to the present invention is arranged such that the average particle size of the fine particles constituting the ceramic filter 20 continuously increases from both the outer peripheral surface 42a and the inner peripheral surface 42b toward the interior of the wall thick portion 42.

That is, the filtrating space of the ceramic filter 20 of the embodiment are arranged most closely on the outer peripheral surface 42a and the inner peripheral surface 42b and the average particle size of the fine particles continuously increases from both surfaces toward the interior of the wall thick portion 42, that is, the through holes 43. As a result, this embodiment is preferably used to a purifying apparatus in which the same type or a different type of unpurified water is supplied from the outer peripheral surface and the center through hole of the ceramic filter 20 and flown in the filter 20 from both the outer peripheral surface 42a and the inner peripheral surface 42b and purified water is collected from the through holes 43.

Further, in another embodiment of the ceramic filter 20, the average particle size of the fine particles forming the ceramic filter 20 continuously increases from the wall surfaces of the through holes 43 toward the interior of the wall thick portion 42.

That is, this embodiment is arranged such that the filtrating space of the ceramic filter 20 is closest on the wall surfaces of the through holes 43 and the average particle size of the fine particles continuously increases toward the interior of the wall thick portion 42, that is, toward the outer peripheral surface 42a and the inner peripheral surface 42b. As a result, this embodiment is preferably used to a purifying apparatus in which unpurified water is supplied to the through holes 43 and flown in the filter from the wall surfaces thereof and purified water is flown out from the outer peripheral surface 42a and the inner peripheral surface 42b for collection.

Further, in still another embodiment of the ceramic filter 20, the average particle size of the fine particles forming the ceramic filter 20 continuously increases from the outer peripheral surface 42a, the inner peripheral surface 42b and the wall surfaces of the through holes 43 toward the interior of the wall thick portion 42.

That is, this embodiment is arranged such that the filtrating space of the ceramic filter 20 is closest on the outer peripheral surface 42a, the inner peripheral surface 42b and the wall surfaces of the through holes 43 and the average particle size of the fine particles continuously increases from the respective surfaces toward the interior of the wall thick portion 42. As a result, this embodiment can be used to supply the same kind of or a different kind of unpurified water from any of the outer peripheral surface 42a, the center through hole 44 and the through holes 43.

Note, in the ceramic filter 20 according to the present invention having the center through hole 44 and the through holes 43, there can be used all the arrangements in which the average particle size of the fine particles forming the ceramic filter continuously increases from the surface of the ceramic filter 20 through which unpurified water flows in toward the interior of the wall thick portion 42 such as, for example, an arrangement that the average increases from any one of the outer peripheral surface 42a and the inner peripheral surface 42b, an arrangement in which only one surface of the ceramic filter 20 in the radial direction thereof is made close on the inner peripheral surfaces of the through holes 43, and the like, in addition to the above embodiments.

Further, the ceramic filter of the present invention may be arranged, for example, as a cylindrical body having two or more through holes in addition to the aforesaid ceramic filter 10 and ceramic filter 20 and further it can be used to all the known ceramic filters such as a plate-shaped ceramic filter and the like.

Further, the ceramic filter of the present invention may be the one in which the average particle size of the fine particles continuously increases from the entire surface layer of a surface of the ceramic filter toward the interior thereof or the one in which the average particle size continuously increases from a portion of the surface layer toward the interior of the filter. Further, the average particle size may be continuously varied over the entire depth direction (the direction in which water flows) of the ceramic filter or may be continuously varied up to the midway of the ceramic filter in the depth direction toward the interior of the filter.

Further, the ceramic filter may contain at least one functional material. For example, when a conductive property is desired to be applied to the filter, a dielectric property is desired to be applied thereto, a magnetic property is desired to be applied thereto, ions are desired to be supplied or captured, a catalytic action is desired to be provided with the filer, the functional material is contained in the filer in accordance with the function to be applied. Then, an electrode 101 may be disposed to the ceramic filter or in relation thereto when necessary. Note, in the ceramic filter provided with the functional property, the average particle size of the fine particles forming the filter need not always continuously increase from a surface of the filter toward the interior thereof and a filter in which the distribution of the particle size is not taken into consideration is also included in the present invention. That is, a filer having a conventional structure (for example, the filter shown in FIG. 1) is also included in the present invention when the function property is applied thereto. The ceramic filter shown in FIG. 3 is also preferable as the functional filter.

Next, the functional material will be exemplified.
(1) Insulating property (high insulating property) alumina ($Al_2O_3$), aluminium nitride (AlN), diamond etc.;
(2) Dielectric property
   zinc oxide, lithium niobate, strontium titanate ($SrTiO_3$) etc.;
(3) Conductive property
   silicon carbide (SiC), molybdenum silicide ($MoSi_2$), conductive barium titanate ($BaTiO_3$), oxides of an element belonging to iron group, vanadium oxide, tin oxide, titania, copper oxide, zinc oxide, zinc oxide varister, stabilized zirconia, $\beta''$-alumina, plated sand etc.;
(4) Magnetic property
   Zn—Mn—ferrite, $SrO.6Fe_2O_3$, needle-shaped $\gamma$-iron oxide etc.;
(5) Ion supplying or capturing material
   ceramic material processed to enable ion exchange or intrinsically having an ion exchanging property; and (6) A catalyst Material for particularly executing oxidation, reduction and other catalytic reactions.

For example, if a filer can be preferably heated to a given high temperature, a fluid can be heated and bacteria can be sterilized at the same time or can be reversely washed. At the time, a conductive material of the item (3) or a dielectric material is used and an electrode is provided with the filter so that the filter can be energized.

Further, the materials shown in the item (4) can remove Mg and Ca contained in water in a large amount, remove, reduce or increase Na and K and remove heavy metals or coloring agents, whereby the filter can be used to various special water processings such as the manufacture of pure water, the manufacture of fresh water from sea water, the manufacture of hard water and soft water, the selective addition or reduction of predetermined ions, and the like or as a fore-process of the special water processings.

Note, to return the ceramic filter having captured ions and metals to its original state, it suffices only to reversely flow a separating liquid or an exchange liquid. The reverse washing in the present invention widely includes not only a case in which reverse washing is simply executed with water or water containing compressed air but also a case in which reverse washing is carried out to restore a functional property using a melting liquid, an exchanging liquid or the like. In short, this operation includes an operation for restoring the function provided with the filter when it starts to be used. Further, the filter may be also cleaned by being baked without load by the application of a current.

As described above, the ceramic filters of the present invention having the average particle size which continuously varies from the surface through which unpurified water flows in (at least one surface) toward the interior of the filter including the ceramic filter 10 and the ceramic filter 20 can be preferably manufactured continuously in a large amount by the ceramic filter manufacturing method of the present invention shown below.

Although the ceramic filter manufacturing method of the present invention (hereinafter, referred to as a manufacturing method) basically employs a molding technology using fine particles as a material such as an extrusion molding technology, an injection molding technology and the like and manufactures a ceramic filter by sintering a resulting molded product, the method executes molding while applying ultrasonic vibration to at least one surface of the molded product. By the application of the vibration, smaller fine particles are moved toward the vibration source side by the difference of the particles sizes of the material fine particles and the difference of the weights of the material fine particles due to the difference of the particle sizes. As a result, the average particle size of the fine particles constituting the ceramic filter (molded product) is made smaller toward the surface to which vibration is applied, whereby the ceramic filter of the present invention in which the distribution of the average particle size as shown in FIG. 2 is achieved and the surface thereof through which unpurified water flows in is made very close can be made. The application of vibration is not always necessary when the aforesaid functional material is added to the filter.

In the manufacturing method of the present invention, as described above, first, there is prepared a material compound containing material fine particles and a binder. When the aforesaid functional property is intended to be applied to the filter, any of the aforesaid functional materials is suitably selected and added.

Types of the material fine particles used in the manufacturing method of the present invention, that is, the fine particles forming the aforesaid ceramic filter 10 (20) of the present invention are not particularly limited and all the materials used to the known ceramic filters can be used. More specifically, there are exemplified aluminium oxide (alumina), zirconium oxide (zirconia), titanium oxide (titania), yttrium oxide, silicon oxide (silica), silicon carbide, silicon nitride, calcium silicate, aluminium silicate, corundum, cordierite, mullite etc. and a composite material made by suitably mixing at least two of these.

Note, although the particle size of the fine particles is not particularly limited and may be suitably selected in accordance with the capability required to a ceramic filter, it is ordinarily about 0.1 $\mu$m to 100 $\mu$m.

In the present invention, since the gradient of distribution of the average particle size is formed in the water passing-through direction of the wall thick portion making use of the ultrasonic vibration in molding, the size of the fine particles need not be carefully adjusted and even if a cheap material having the wide range of particle sizes (distribution of particle sizes) is used, a ceramic filter of high performance can be realized.

Further, the binder is not particularly limited and there may be used any of various types of binders which is used when a molded product is made from fine particles by extrusion molding or injection molding. More specifically, there are exemplified various types of alcohols, celluloses such as methyl cellulose, ethyl cellulose etc., starches, vinyl resins, various waxes, thermoplastic polyolefins such as polyethylene, polypropylene etc., polyacetate vinyl compounds etc.

Various assistants including lubricant such as propylene glycol, glycerin, stearic acid and their salts etc., a sintering assistant such as silica, carbon, boron, magnesia etc., and the like may be added in addition to the fine particles and the binder.

Note, the material compound may be prepared by a known method.

After the preparation of the material compound, a molded product corresponding to a target ceramic filter is made by extrusion molding, injection molding and the like.

In the manufacturing method of the present invention, a molded product is made while applying ultrasonic vibration to at least one surface thereof through which filtration is executed.

Since the material fine particles of the ceramic filter are made by crushing material blocks, all the material particles do not have a uniform particle size except the case that they are sieved with a considerably high accuracy. The material fine particles usually has a certain degree of range, that is, a distribution of particle size. Since the material compound is molded while applying ultrasonic vibration to at least one surface of the molded product in the manufacturing method of the present invention, the small fine particles in the material compound move toward a vibration source side in accordance with the difference of the particles sizes and the difference of the weights of the material fine particles by the application of the ultrasonic vibration during molding or after molding. As a result, the average particle size of the fine particles constituting the ceramic filter (molded product) is continuously made smaller toward the surface thereof to which vibration is applied, thus the ceramic filter having the distribution of the average particle size as shown in FIG. 2 can be made by selecting a surface to which vibration is applied.

More specifically, when the ceramic filter 10 of the embodiment of the present invention shown in FIG. 2 is made, it suffices only to apply ultrasonic vibration to the outer peripheral surface 10a during molding or after molding.

Likewise, it is sufficient only to apply ultrasonic vibration to the inner peripheral surface 10b in the second embodiment, to the outer peripheral surface 10a and the inner peripheral surface 10b in the third embodiment and to the outer peripheral surface 42a during molding or after molding, respectively. Further, as to the ceramic filter 20 shown in FIG. 3, vibration is applied to the outer peripheral surface 42a and the inner peripheral surface 42b in the first embodiment, to the wall surface of the through holes 43 in the second embodiment and to the outer peripheral surface 42a, the inner peripheral surface 42b and the wall surfaces of the through holes 43 in the third embodiment during molding or after molding, respectively. However, it is preferable to apply ultrasonic vibration while molding the ceramic filter.

Ultrasonic waves mean all the sound waves whose object is not to be heard but to be used to change the body and the material regardless of their frequencies (refer to "Handbook of Ultrasonic Sound Technology" published by Nikkan Kogyo Shinbun or "Latest Strong Ultrasonic Wave Technology" published by Sohgoh Gijutu Center) and the like. Therefore, the ultrasonic vibration in the present invention covers vibrations having all the frequencies used as ultrasonic waves at present, and more specifically, covers the vibrations of about several kHz to 20 MHz.

Note, in the present invention, the frequency of the ultrasonic vibration is suitably determined depending upon the shape of fine particles to be used, a type of the binder, a viscosity of the compound, and the like.

Further, the period of time during which the ultrasonic vibration is applied may be suitably determined in accordance with the distribution of particle sizes of the material fine particles to be used and the like. Note, in the extrusion molding apparatus and the like to be described later, the period of time can be approximated to the staying time of the material compound until a molded product is discharged after the material compound is supplied to a die.

As a method of applying ultrasonic vibration to a wall surface corresponding to a molded product, there is exemplified a method of disposing (burying) an ultrasonic vibrator to a portion corresponding to the wall surface of a mold or a core for executing injection molding or extrusion molding to which vibration is applied.

After a molded product having the gradient of distribution of the average particle size is made, the molded product is sintered conventionally, as with an ordinary ceramic filter to thereby obtain the ceramic filter of the present invention.

The sintering method is not particularly limited and various known methods may be employed such as a non-pressurized sintering method and a reduced pressure (vacuum) sintering method executed in an inactive atmosphere, an oxidizing atmosphere, a reducing atmosphere and the like, a sintering method executed by being pressurized in one-axis or equal direction and the like.

Further, sintering conditions such as temperature, atmosphere, pressure, time and the like are not particularly limited and they may be suitably determined depending upon the types of the material fine particles, the binder, and the like.

Figure 4:
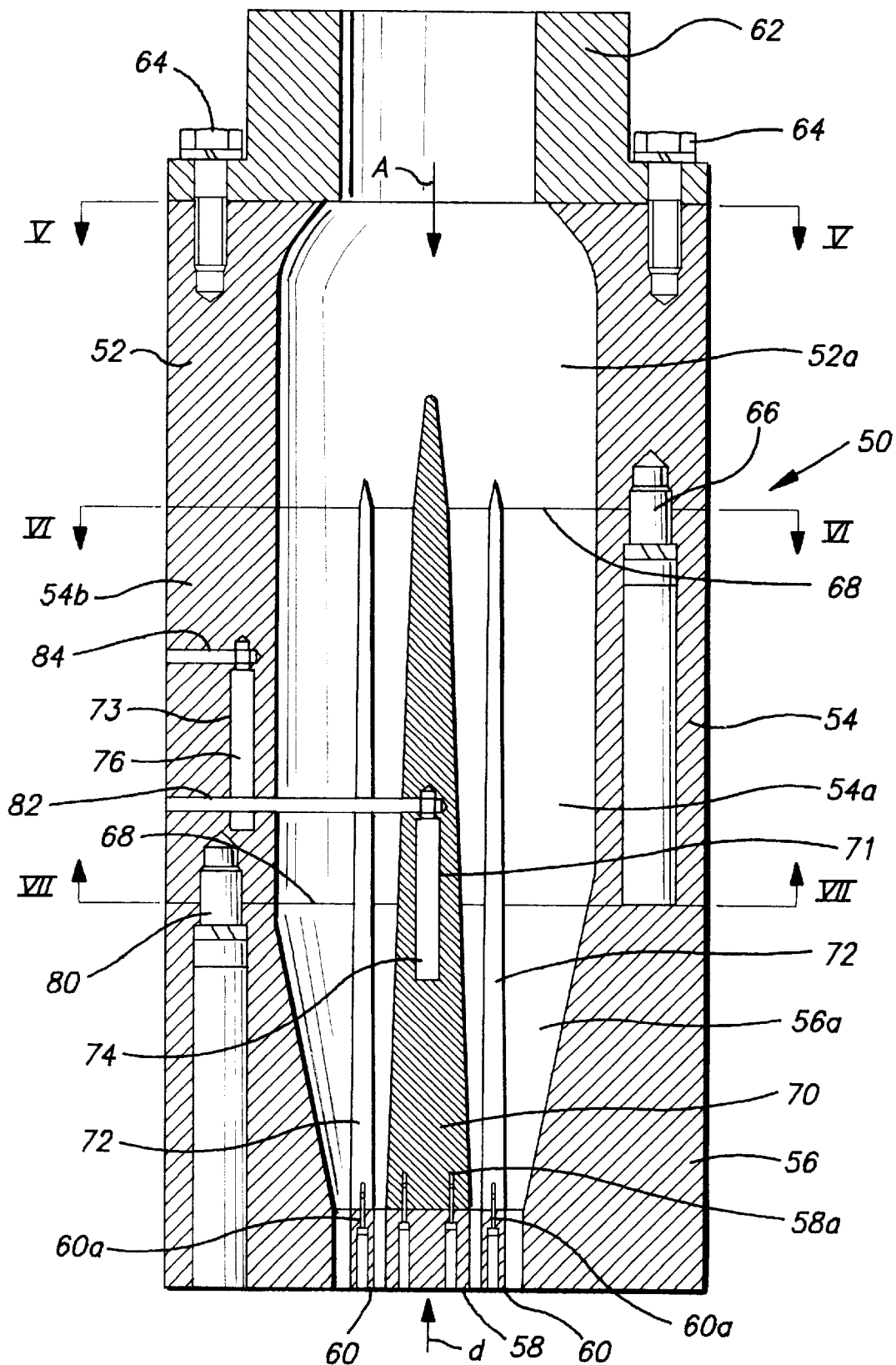
FIG. 4 is a schematic cross sectional view of an extrusion molding apparatus of the present invention.
Figure 5:
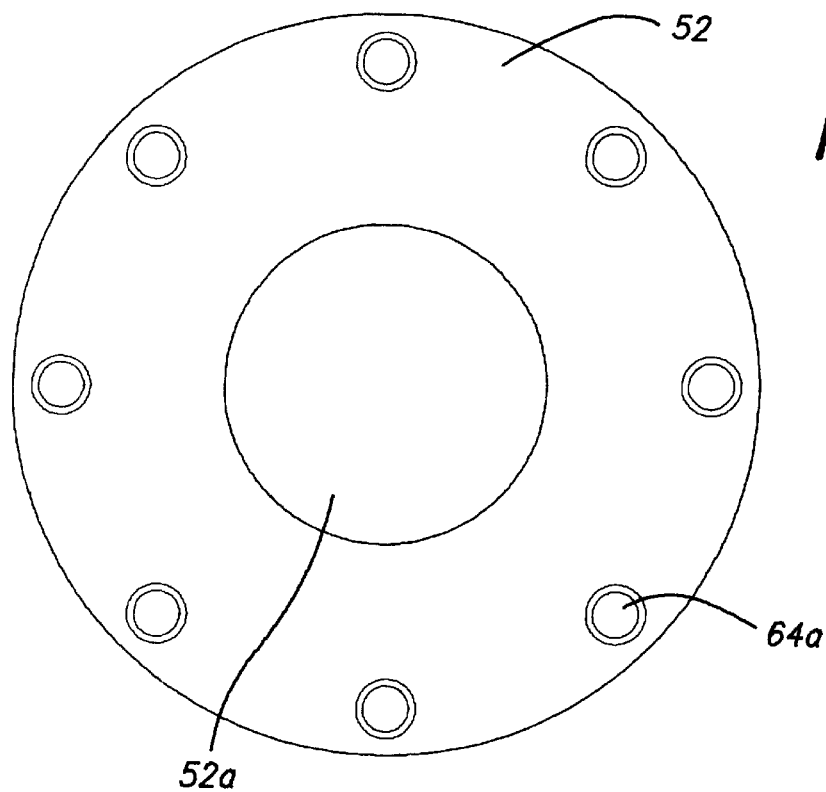
FIG. 5 is a view exploded along the line V of FIG. 4.
Figure 6:
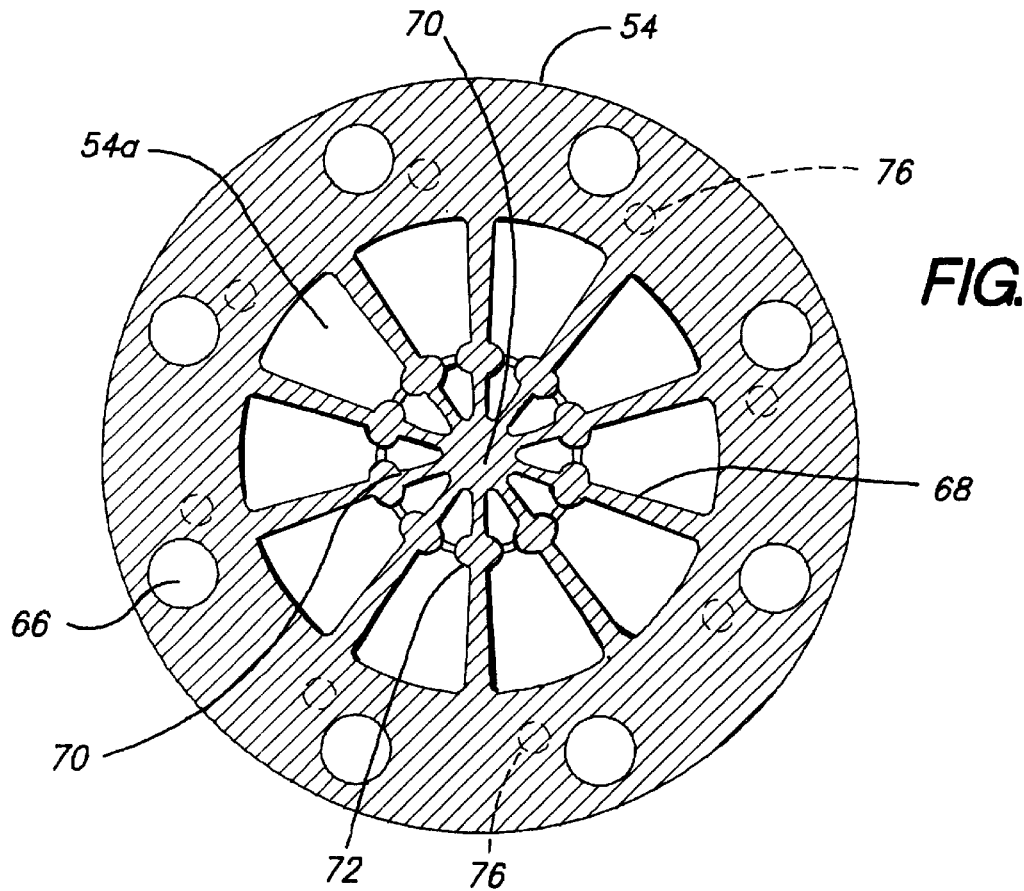
FIG. 6 is a cross sectional view taken along the line VI of FIG. 4.
Figure 7:
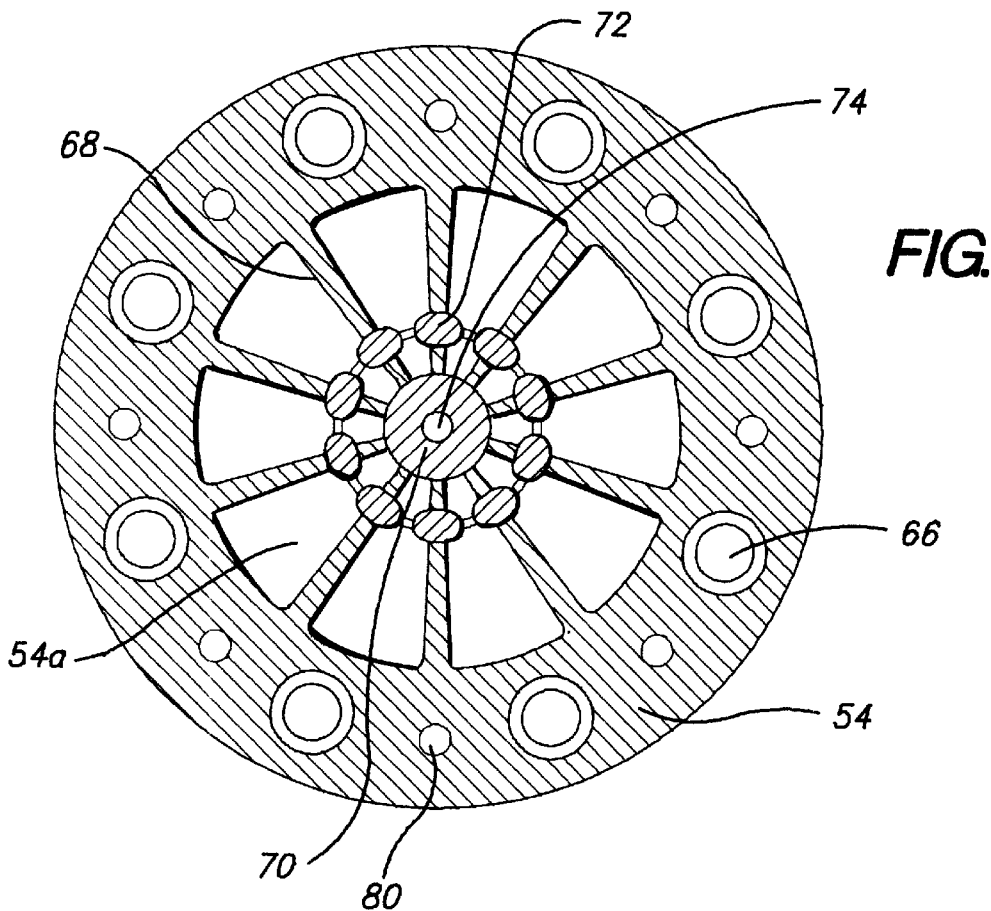
FIG. 7 is a cross sectional view taken along the line VII of FIG. 4.
Figure 8:
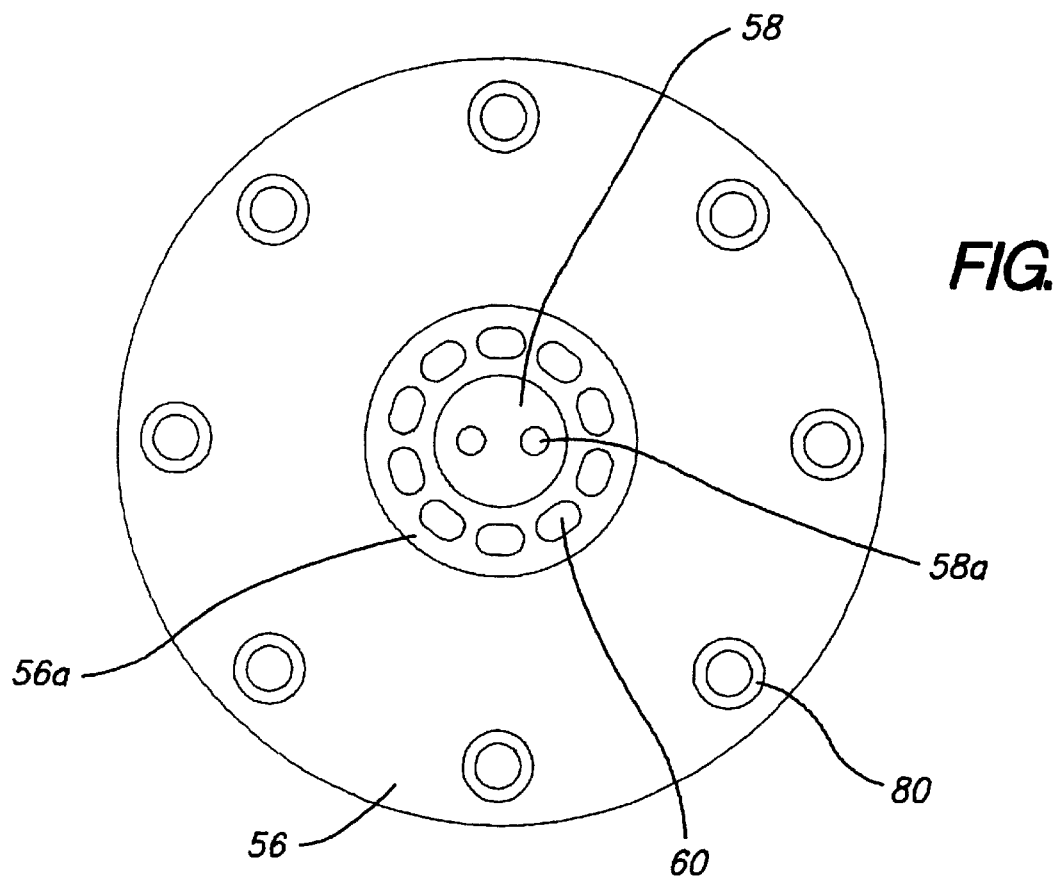
FIG. 8 is a view in the direction of the arrow d in FIG. 4.

FIG. 4 is a schematic cross sectional view of an extrusion molding apparatus of the present invention for embodying the aforesaid manufacturing method of the present invention. FIG. 5 shows a plan view taken along the line V of FIG. 4. FIG. 6 shows a cross sectional view taken along the line VI of FIG. 4. FIG. 7 shows a cross sectional view taken along the line VII of FIG. 4. And FIG. 8 shows a view in the direction of the arrow d in FIG. 8, respectively.

The extrusion molding apparatus of the present invention includes a ceramic filter exclusion molding die 50 (hereinafter, referred to as a molding die 50) of the present invention and an extrusion device 62 for extruding a material compound to the extrusion molding die 50.

Note, as the extrusion device 62, all the known extrusion devices used to an extrusion molding apparatus such as a screw feeder, an extrusion kneader having a single axis or a plurality of axes and the like can be used.

The illustrated molding die 50 of the present invention is used to manufacture the ceramic filter 20 having the center through hole 44 and a plurality of the through holes 43 shown in FIG. 3, basically composed of a first die portion 52, a second die portion 54, a third die portion 56, a fourth die portion 58 and ten pieces in total of fifth die portions 60, 60 . . . as shown in FIG. 4–FIG. 8 and has an approximately cylindrical shape.

With reference to FIG. 5, the first die portion 52 has an approximately cylindrical shape and coupled with and fixed to the extrusion device 62 by eight pieces in total of bolts 64, 64 . . . .

That is, the molding die 50 exemplified in the drawing is coupled with the extrusion device 62 as a whole through the first die portion 52 coupled with the extrusion device 62 and a material compound is supplied to the cavity 52a of the first die portion 52 from the extrusion device 62 as shown by an arrow A. Note, numeral 64a shown in FIG. 5 denotes screw holes with which bolts 64 are threaded.

The molding die 50 of the present invention arranged as described above may be detachably used like an attachment and can easily cope with the manufacture of many types of ceramic filters by the preparation of molding dies corresponding to various shapes of ceramic filters.

With reference to FIG. 6, the second die portion 54 basically has a cylindrical shape and is connected and fixed to the end surface of the first die portion 52 on the downstream side thereof by eight pieces in total of bolts 66.

As shown in FIG. 4, FIG. 6 and FIG. 7, ten beams 68, 68 . . . are stretched to the cavity 54a of the second die portion 54 in the radial direction thereof, a center column portion 70 corresponding to the center through hole 44 of the ceramic filter 20 is formed at the center of the cavity 54a, that is, at the extreme ends of all the beams 68, 68 . . . . Further column portions 72, 72 . . . corresponding to the through holes 43 of the ceramic filter 20 are formed between the center column portion 70 of the respective beams 68, 68 . . . and the inner wall surface of the second die portion 54. Note, although the center column portion 70 is connected to the columns 72 thorough the beams 68 to secure strength in the illustrated example, if the strength of the respective column portions is not increased when the compound is extruded, the beams are not always needed.

As shown in FIG. 4., the center column portion 70 and the column portions 72 slightly project from the second die portion 54 on the upstream side thereof and enter the cavity 52a of the first die portion 52. Further, the center column portion 70 and the column portions 72 slightly project from the second die portion 54 on the downstream side thereof and enter the cavity 56a of the third die portion 56 to be described later and extend up to the vicinity of the end surface (discharge portion) of the third die portion 56 on the downstream side thereof. The extreme end of the center column portion 70 on the downstream side thereof is fixed to the fourth die portion 58 and the extreme ends of the column portions 72, 72 . . . on the downstream side thereof are fixed to the fifth die portions 60, 60 . . . .

With reference to FIG. 7 and FIG. 4, the diameter of the cavity 56a of the third die portion 56 is gradually reduced toward the downstream direction as well as has an approximately cylindrical shape with the cavity 56a having a given diameter in the vicinity of th e discharge portion thereof on the downstream side and the third die portion 56 is fixed to the second die portion 54 by bolts 80.

With reference to FIG. 8, the fourth die portion 58 is composed of a columnar body having a shape corresponding to the center through hole 44 of the ceramic filter 20 and supports and fixes the extreme end of the center column portion 70 of the second die portion 54 on the downstream side thereof by two bolts 58a.

Further, the fifth die portions 60, 60 . . . are composed of columnar bodies having shapes corresponding to the through holes 43 of the ceramic filter 20 and fix and support the extreme ends of the column portions 72, 72, . . . of the second die portion 54 on the downstream side thereof by bolts 60a. Note, the bolts 60a are omitted in FIG. 8 for the simplification of the drawing.

In the molding die 50 arranged as described above, the material compound is extruded from the extrusion device 62 into the molding die 50 in the direction of the arrow A and supplied into the first die portion 52 and discharged from the end surface of the third die portion 56 through the second die portion. At the time, the material compound is molded to a shape corresponding to the ceramic filter 20 by the center column portion 70 which corresponds to the center through hole 44 of the ceramic filter 20 and is disposed to the inner wall surfaces of the first die portion 52 to the third die portion 56, the cavity 54a of the second die portion 54 and the cavity 56a of the third die portion 56, the column portions 72 corresponding to the fourth die portion 58 and the through holes 43 of the ceramic filter 20 and the fifth die portion 60.

Consequently, in the molding die 50 exemplified in the drawing, the peripheral wall portions of the first die portion 52, the second die portion 54 and the third die portion 56 serve as a mold for forming the exterior of the ceramic filter 20 and the center column portion 70 and the fifth die portion 58 serve as a first core for forming the center through hole 44 of the ceramic filter 20 and the column portions 72, 72 . . . and the sixth die portions 60, 60 . . . serve as a second core for forming the through holes 43, 43 . . . of the ceramic filter 20.

An accommodating hole 71 is formed to the center hole 70 of the second die portion 54 of the molding die 50 and an ultrasonic generator (Ultrasonic vibration motor) 74 held by a fixing pipe 82 is disposed therein and eight pieces in total of accommodating holes 73 are also formed to the peripheral wall portion 54b of the second die portion 54 at equal intervals (intervals of 45°) in a peripheral direction and eight pieces in total of ultrasonic vibrators 76 held by a fixing pipe 84 are disposed therein. Note, the fixing pipes 82 and 84 also serve as lines for supplying drive power and cooling water to the ultrasonic vibrators. It is preferable that these pipes do not pass through the cavities 54a, 56a through which the ceramic filter passes as far as possible.

When extrusion molding is executed in the state that the respective ultrasonic vibration motors are driven, ultrasonic vibration is transmitted from the surface of the ceramic filter toward the interior thereof to thereby ultrasonically vibrate the inner peripheral surface of the second die portion 54. That is, the inner peripheral surface of the mold and the center column portion 70 of the second die portion 54, the first core, are vibrated so that the extrusion molding is executed in the state that the ultrasonic vibration is applied to the respective surfaces corresponding to the ceramic filter 20, the outer peripheral surface 42a and the inner peripheral surface 42b. With this operation, since small fine particles move to the vibration source side, that is, to the outer peripheral surface 42a side and the inner peripheral surface 42b side as described above, the ceramic filter of the present invention (unsintered molded product thereof) in which the average particle size of the fine particles continuously increases from the outer peripheral surface 42a and the inner peripheral surface 42b of the ceramic filter toward the interior thereof can be manufactured.

Likewise, the aforesaid second ceramic filter 20 can be manufactured by the disposition of the ultrasonic vibrators to the column portions 72, 72 . . . and the sixth die portions 60, 60 . . . (that is, the second core) and the third ceramic filter 20 can be manufactured by the disposition of the ultrasonic vibrators to all of the first and second cores.

A type of a usable ultrasonic vibrator (electro-sound converter) is not particularly limited and all the known ultrasonic vibrators such as a magnetic strain vibrator making use of nickel, nickel-chromium alloy, magnetic strain ferrite etc., an electric strain vibrator making use of barium titanate, zirconate titanate etc., a piezoelectric vibrator making use of crystal, lithium sulfate etc., and the like are suitable.

The positions where the ultrasonic vibrators are disposed and the number thereof are not limited to the illustrated example and a plurality of the vibrators may be disposed to the center column portion 70 and further the number of the vibrators disposed to the peripheral wall portion 54b of the second die 54 may be set to seven or less or nine or more.

Note, although the greater number of the vibrators can suitably change the average particle size, the number thereof may be suitably determined in accordance with the strength of the mold and the core, the viscosity (fluidity) of the material compound and the like.

Further, although the ultrasonic vibrators are disposed at the center of the first core and further equally disposed in the peripheral direction of the ceramic filter, the present invention is not limited thereto and the ultrasonic vibrators may be eccentrically disposed or a plurality of the ultrasonic vibrators may be disposed at eccentric positions so that the average particle size can be reduced at the particular position of the wall surface of the ceramic filter.

It is preferable that the porous ceramic filter manufacturing extrusion molding die 50 of the present invention has a means for closely pressing ceramics matrix during a period of time until a ceramic material is molded to a predetermined structure and extruded after it is extruded into the die 50 from the extrusion device 62 as shown by the arrow A. Although this close press is somewhat executed by ultrasonic sounds, it is preferable to provide the die structure with the close press means. It is preferable in the die 50 of the present invention that the close press means is arranged such that the cross sectional area of the extrusion passages (for example, cavities 52a, 54a, 56a), through which the ceramic material extruded from the extrusion device 62 passes, is gradually reduced toward the extreme end in the extruding direction on the plane of the passages perpendicular to the extruding direction. That is, the extrusion passages are narrowed or contracted gradually and gently or abruptly or by the combination thereof so as to obtain a predetermined ceramic filter.

The close press means is not always necessary, depending upon a ceramic filter to be obtained. This is applied, for example, to the manufacture of a ceramic filter composed of rough particles and having a roughly porous structure which can be made only by being molded after a material compound is extruded by the extrusion device. Otherwise, when a ceramic filter has been closely pressed in another place, the close press means is not necessary and it suffices only to finally mold the closely pressed ceramic filter to a molded product while applying ultrasonic vibration thereto.

Although an example of the arrangement of the close press means will be described, it is not limited thereto. The molding die 50 exemplified in FIG. 4 is preferably arranged such that the diameter of the center column portion 70 of the second die portion 54, that is, the first core is gradually and gently expanded toward the extruding direction and the diameter of the cavity 56a of the third die 56, that is, the mold is gradually and abruptly reduced toward the extruding direction.

With this arrangement, the molding pressure for extrusion molding can be increased as well as the density of the fine particles of the molded product can be increased, whereby a ceramic filter having an excellent mechanical strength can be realized.

Note, the diameter of the second core may be gradually increased toward the extruding direction when necessary.

The molding die 50 is composed of first to fifth die portions which are separable from one another. Therefore, ceramic filters (unsintered molded products) having various shapes and sizes can be manufactured by replacing the respective die portions.

For example, the sizes, positions and shapes of the center through hole 44 and the through holes 43 of the ceramic filter 20 can be changed by replacing the second die portion 54, the fourth die portion 58 and the fifth die portion 60 and further the outside diameter and shape of the ceramic filter 20 can be changed by replacing the third die portion 56.

Although the molding die 50 described above is used to manufacture the ceramic filter 20 shown in FIG. 3, it the first to third embodiments of the present invention shown in FIG. 1, that is, the hollow cylindrical ceramic filters can be manufactured by arranging the extrusion molding die without the second core, that is, without the column portions 72, 72 . . . and the sixth die portions 60, 60 . . . .

Although the method of manufacturing the ceramic filter, the extrusion molding die and the extrusion molding apparatus provided therewith of the present invention have been described above in detail, various changes and improvements may be made thereto without departing from the gist of the present invention.

As described above in detail, since the ceramic filter of the present invention is provided with the functional property, the surface thereof through which water flows in is closest in addition to the functional property and further the average particle size thereof continuously varies, the ceramic filter has a very high purifying capability as well as almost all the impurities are captured on the surface of the ceramic filter, thus the filter can be easily washed reversely and there is no possibility of layer exfoliation as in a conventional example.

Further, according to the manufacturing method and the extrusion molding apparatus of the present invention, the excellent ceramic filter can be easily manufactured at high efficiency.

I claim:

1. A porous ceramic filter made by sintering particles, comprising a first surface and a second surface, wherein the average particle size of said particles forming said porous ceramic filter continuously increases from said first surface toward said second surface.

2. A porous ceramic filter according to claim 1, wherein said first surface is an outer peripheral surface and said second surface is an inner peripheral surface, and wherein said porous ceramic filter is composed of a hollow cylindrical body and the average particle size of said particles continuously increases from said outer peripheral surface toward said inner peripheral surface and from said inner peripheral surface toward said outer peripheral surface.

3. A porous ceramic filter according to claim 1, wherein said porous ceramic filter is composed of a cylindrical body having a plurality of through holes, each through hole having a through hole surface and the average of said particles continuously increases from said first surface and from a said through hole surface.

4. A porous ceramic filter according to claim 1, wherein said porous ceramic filter further comprises a cylindrical body having, an outer peripheral surface, a center through hole, having a peripheral surface, and a plurality of through holes formed between said center through hole and said outer peripheral surface of said filter and extending in the same direction as said center through hole, the average particle size of said particles continuously increases from said outer peripheral surface and said peripheral surface of said center through hole of said cylindrical body.

5. A porous ceramic filter according to claim 1, wherein said porous ceramic filter is composed of a cylindrical body having outer peripheral surface and a center through hole, and a plurality of through holes formed between the center through hole and said outer peripheral surface of said filter and extending in the same direction as said center through hole, wherein the average particle size of said particles continuously increases from at least one through hole.

6. A porous ceramic filter according to claim 1, wherein said porous ceramic filter is composed of a cylindrical body with an outer peripheral surface and having a center through hole, and a plurality of through holes formed between the center through hole and the outer peripheral surface of said filter and extending in the same direction as said center through hole, each said through hole having a through hole peripheral surface, where the average particle size of said particles forming said porous ceramic filter continuously increases from said outer peripheral surface, from a said through hole peripheral surface, and from said center through hole.

7. A porous ceramic filter according to claim 1, wherein said ceramic filter filters particles based on particle size and further comprises at least one additional functional material.

8. A porous ceramic filter according to claim 7, wherein said additional functional material is selected from the group consisting of a magnetic material, a catalyst, an ion supplying material, and an ion capturing material.

9. A porous ceramic filter according to claim 7, wherein said additional functional material is selected from the group consisting of a dielectric substance, a conductor and a semiconductor.

10. A porous ceramic filter according to claim 7, further including an electrode.

11. A method of manufacturing a porous ceramic filter by preparing a material compound containing particle material and a binder, molding the material compound within a die to a predetermined shape and sintering the molded product, wherein an ultrasonic vibrator is disposed within a wall of said die, and said molding is executed while applying ultrasonic waves by said ultrasonic vibrator to at least one surface of said molded product so that average particle size of said molded product continuously increases from said one surface.

12. A method of manufacturing a porous ceramic filter according to claim 11, wherein said molded product is composed of a cylindrical body with an outer peripheral surface and having at least one through hole having a through hole peripheral surface and said molding is executed while applying ultrasonic waves to said outer peripheral surface and said through hole peripheral surface of the at least one through hole of said molded product.

13. A method of manufacturing a porous ceramic filter according to claim 11, wherein said molded product is composed of a cylindrical body with an outer peripheral surface and having a center through hole with a peripheral surface and a plurality of through holes formed between the center through hole and the outer peripheral surface of said filter and extending in the same direction as said center through hole each said through hole comprising a through hole surface and said molding is executed while applying ultrasonic waves to at least one surface selected from said outer peripheral surface of said molded product, said peripheral surface of said center through hole and said peripheral surface of at least one through hole.

14. A method of manufacturing a porous ceramic filter according to claim 11, wherein said compound contains a functional material.

15. A method of manufacturing a porous ceramic filter according to claim 14, wherein said functional material is at least one selected from a magnetic material, a catalyst, an ion supplying material, and an ion capturing material.

16. A method of manufacturing a porous ceramic filter according to claim 15, wherein said functional material is selected from the group consisting of a dielectric substance, a conductor and a semiconductor.

17. A method of manufacturing a porous ceramic filter by preparing a material compound containing a particle material and a binder, molding the material compound under pressure within a die to a predetermined shape and sintering the molded product, wherein an ultrasonic vibrator is disposed within at least one location in a wall of said die for forming said molded product, and said molding is executed while applying ultrasonic waves by said ultrasonic vibrator to at least one surface of said molded product so that the average particle size is continuously varied through said molded product.

18. A method of manufacturing a porous ceramic filter according to claim 17, wherein said molded product is composed of a cylindrical body having an outer peripheral surface and having at least one through hole with a peripheral surface and said molding is executed while applying ultrasonic waves to said outer peripheral surface and said peripheral surface of the at least one through hole.

19. A method of manufacturing a porous ceramic filter according to claim 17, wherein said molded product is composed of a cylindrical body having an outer peripheral surface and having a center through hole with a peripheral surface and a plurality of through holes formed between the center through hole and the outer peripheral surface of said filter and extending in the same direction as said center through hole, each of said plural through holes having a peripheral surface, and said molding is executed while applying ultrasonic waves to at least one of said outer peripheral surface of said molded product, said peripheral surface of said center through hole, and a said peripheral surface of said plural through holes.

20. A method of manufacturing a porous ceramic filter according to claim 17, wherein sid compound contains at least one functional material.

21. A method of manufacturing a porous ceramic filter according to claim 20, wherein said functional material is at least one selected from a magnetic material, a catalyst, an ion supplying material, and an ion capturing material.

22. A method of manufacturing a porous ceramic filter according to claim 21, wherein said functional material is selected from the group consisting of a dielectric substance, a conductor and a semiconductor.

23. A porous ceramic filter manufacturing extrusion molding die used by being coupled with an extrusion device in the manufacture of a porous ceramic filter, wherein an ultrasonic vibrator is disposed to at least one location within a side wall of said die for forming the molded product of the ceramic filter extruded by said extrusion device.

24. A porous ceramic filter manufacturing extrusion molding die used by being coupled with an extrusion device in the manufacture of a porous ceramic filter composed of a cylindrical body with an exterior, having at least one through hole, comprising a mold having a cavity for forming the exterior of the molded product of a ceramic filter extruded by an extrusion device and at least one core disposed in the cavity of said mold by extending in an extruding direction and mounted in said mold for forming the through hole of said ceramic filter, wherein ultrasonic vibrators are disposed within at least one of said mold and said at least one core.

25. A porous ceramic filter manufacturing extrusion molding die according to claim 24, wherein said core is detachable or replaceable.

26. A porous ceramic filter manufacturing extrusion molding die used by being coupled with an extrusion device in the manufacture of a porous ceramic filter with an exterior, an outer peripheral surface, a center through hole and a plurality of through holes formed between said center through hole and said outer peripheral surface of said filter and extending in the same direction as said center through hole, comprising a mold having a cavity for forming said exterior of the molded product of said ceramic filter extruded by said extrusion device and a first core disposed in the cavity of said mold by extending in an extruding direction for forming said center through hole and a plurality of second cores disposed between the inner wall surface of said mold and said first core for forming a plurality of said through holes, wherein at least one ultrasonic vibrator is disposed to at least one element selected from said mold, said first core and at least one of said second cores.

27. A porous ceramic filter manufacturing extrusion molding die according to claim 26, wherein said first core and said second core are detachable or replaceable.

28. A porous ceramic filter manufacturing extrusion molding die used by being coupled with an extrusion device in the manufacture of a porous ceramic filter, wherein an ultrasonic vibrator is disposed to at least one location within the side wall of said die so that ultrasonic waves may be applied during molding the molded product of a ceramic filter extruded by said extrusion device so that said molded product has particles whose average particle size is continuously varied from said wall's surface and means for pressurizing said molded body is provided.

29. A porous ceramic filter manufacturing extrusion molding die used by being coupled with an extrusion device in the manufacture of a porous ceramic filter having an exterior composed of a cylindrical body having at least one through hole, comprising a mold having a cavity for forming said exterior of said ceramic filter extruded by an extrusion device and at least one core disposed in the cavity of said mold by extending in an extruding direction and mounted in said mold for forming the through hole of said ceramic filter, wherein ultrasonic vibrators are disposed in at least one of said mold and said at least one core, and means for pressurizing said molded body is provided.

30. A porous ceramic filter manufacturing extrusion molding die according to claim 28, wherein said pressurizing means is composed of a mold portion having a diameter gradually reduced in an extruding direction and at least one core portion having a diameter gradually expanding in an extruding direction.

31. A porous ceramic filter manufacturing extrusion molding die according to claim 29, wherein said core is detachable or replaceable.

32. A porous ceramic filter manufacturing extrusion molding die used by being coupled with an extrusion device in the manufacture of a porous ceramic filter having a center through hole and a plurality of through holes formed between the center through hole and an outer peripheral surface of the filter and extending in the same direction as the center through hole, comprising a mold having a cavity for forming an exterior of said ceramic filter extruded by said extrusion device and a first core disposed in the cavity of said mold by extending in an extruding direction for forming said center through hole and a plurality of second cores disposed between an inner wall surface of said mold and said first core for forming a plurality of said through holes, wherein at least one ultrasonic vibrator is disposed to at least one element selected from said mold, said first core and at least one of said second cores and means for pressing said molded body is provided.

33. A porous ceramic filter manufacturing extrusion molding die according to claim 32, wherein said pressing means is composed of a mold portion having a diameter gradually reduced in said extruding direction and a first core portion having a diameter gradually increasing in said extruding direction.

34. A porous ceramic filter manufacturing extrusion molding die according to claim 32, wherein said first core or at least one of said second cores is detachable or replaceable.

35. An extrusion molding apparatus, comprising an extrusion device with an extruding port for extruding a material compound containing particle material and a binder mounted to the porous ceramic filter manufacturing extrusion molding die according to claim 23.

36. An extrusion molding apparatus, comprising an extrusion device for extruding a material compound containing particle material and a binder mounted to the porous ceramic filter manufacturing extrusion molding die according to claim 28.

* * * * *